L. E. EVANS,

Assignor to H. B. EVANS, Trustee.

WIRE BALE TIE.

No. 10,176. Reissued Aug. 8, 1882.

WITNESSES:
Gustave Dieterich.
M. F. Burns.

INVENTOR:
Lemuel E. Evans
BY Park Benjamin & Co
ATTORNEYS.

N. PETERS. Photo-Lithographer, Washington, D. C.

UNITED STATES PATENT OFFICE.

LEMUEL E. EVANS, OF NEW YORK, N. Y., ASSIGNOR TO HARRIET B. EVANS, TRUSTEE.

WIRE BALE-TIE.

SPECIFICATION forming part of Reissued Letters Patent No. 10,176, dated August 8, 1882.

Original No. 229,392, dated June 29, 1880; application for reissue filed July 13, 1882.

*To all whom it may concern:*

Be it known that I, LEMUEL E. EVANS, a citizen of the United States, residing at New York, in the county and State of New York, have invented new and useful Improvements in Wire Bale-Ties, of which the following is a specification.

This invention relates to that class of bale-ties consisting of a wire band one end of which is bent to form an eye, while the other end is straight, and is tied or knotted with the eye when the whole is applied to use. In all bale-ties of this character known to me that portion of the wire composing the eye is single, and hence the eye is comparatively weak; and the object of my invention is to increase the strength of the eye without materially adding to the cost of the article.

It consists in a wire band which is doubled, or which is bent back on itself at one end, and in which such doubled or bent-back portion is bent and twisted to form an eye; also, in the combination of two double eyes, as hereinafter more fully set forth.

Figure 1:
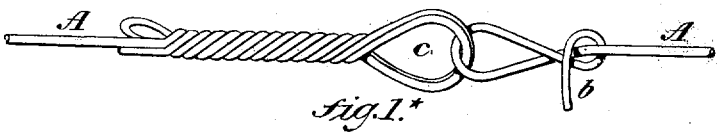
Figure 1:
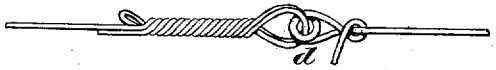
Figure 2:
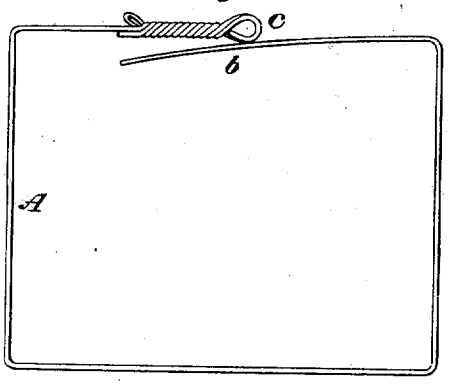
Figure 3:
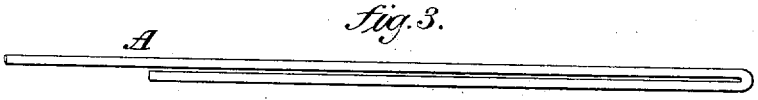
Figure 4:
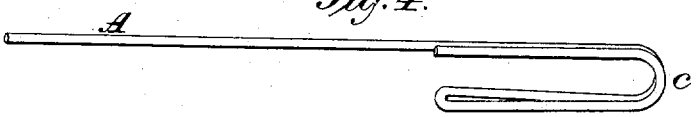

This invention is illustrated in the accompanying drawings, in which Figures 1 and 1* show the locking devices of the tie. Fig. 2 is a side view of the complete article. Figs. 3 and 4 are detail views hereinafter referred to. Similar letters of reference indicate corresponding parts.

The letter A designates the wire band composing my tie, the same being substantially straight at one end, as at *b*, and having an eye, *a*, at the opposite end.

In carrying out my invention I first double the wire band A either by placing a short piece of similar wire beside it or by bending it back upon itself at one end, the latter as shown in Fig. 3. In either case the result accomplished will be the same in ultimately producing the eye *c*. I then bend such doubled portion of the band about midway thereof, as shown in Fig. 4, thereby forming the bight of the eye *c*, whereupon I twist the same, as shown in Fig. 1, to complete or close the eye. It will be seen that the eye thus obtained possesses great strength and is capable of withstanding a great amount of strain, while the only addition to the cost of the band is that of a piece of wire equal to the doubled portion thereof, which obviously is trifling.

The free end *b* of the wire band may be passed through the double eye *c* once, and then knotted, as shown in Fig. 1, or it may be twice passed through the eye previous to knotting the same, as at *d*, Fig. 1*.

The arrangement last named is a novel feature in bale-ties, and by its means the effect of the eye *c* is materially increased, inasmuch as the wire band A is practically furnished with a double eye at both ends.

Prior to my invention a bale-tie fastening has been formed by bending the wire upon itself and then partially twisting the same to form an eye; but in such the eye, being of a single strand, is liable to breakage or cutting, due to the strain exerted by the outward pressure of the bale. By my invention such liability is avoided, because after the band is doubled or bent back upon itself it is again folded upon itself and twisted to form a permanent eye to receive and connect with the free end of the band.

What I claim as new, and desire to secure by Letters Patent, is—

1. A bale-tie fastening consisting of a wire band which is doubled at one end, the said doubled end being then bent back on itself and twisted to form an eye which receives and connects with the free end of the band, substantially as and for the purpose described.

2. In a wire bale-tie, an eye formed of two strands of wire at one end of the band, the said strands, after forming the loop of the eye, being secured by twisting them with the main portion of the band, and the said eye receiving and connecting with the free end of the band, substantially as described.

LEMUEL E. EVANS.

Witnesses:
P. BENJAMIN,
M. F. BURNS.